United States Patent [19]

Boppart

[11] Patent Number: 4,963,066
[45] Date of Patent: Oct. 16, 1990

[54] GRAIN HOPPER ASSEMBLY

[75] Inventor: Loren P. Boppart, DeKalb, Ill.

[73] Assignee: Mayrath Industries, Inc., Compton, Ill.

[21] Appl. No.: 233,477

[22] Filed: Aug. 15, 1988

[51] Int. Cl.⁵ ............................................. B60P 1/40
[52] U.S. Cl. ................................. 414/376; 198/311; 198/671; 198/674; 414/397; 414/505; 414/526
[58] Field of Search ............... 414/526, 523, 502-505, 414/518, 326, 345, 292, 391, 397, 398, 376, 390, 572, 573; 198/311, 550.1, 671, 674

[56] References Cited

U.S. PATENT DOCUMENTS

| | | | |
|---|---|---|---|
| 1,346,678 | 7/1920 | Pratt | 198/311 |
| 2,318,176 | 5/1943 | Massano | 198/311 X |
| 2,585,169 | 2/1952 | Potter | 414/505 |
| 2,619,219 | 11/1952 | Carroll et al. | 198/311 |
| 2,754,982 | 7/1956 | Hoffmeister et al. | 414/376 |
| 2,834,493 | 5/1958 | Romberg | 414/526 X |
| 3,014,575 | 12/1961 | Klein | 198/659 |
| 3,035,682 | 5/1962 | Ferch | 198/671 X |
| 3,179,272 | 4/1965 | Goldberger | 414/526 X |
| 3,253,695 | 5/1966 | Gooding | 198/621 X |
| 3,300,032 | 1/1967 | Dion | 198/550.1 |
| 3,339,530 | 9/1967 | Gillette | 198/550.1 X |
| 3,342,315 | 9/1967 | Godley | 198/671 |
| 3,520,434 | 7/1970 | Destefan et al. | 414/518 X |
| 3,528,570 | 9/1970 | Pase | 414/376 |
| 3,721,333 | 3/1973 | Boovie | 414/526 X |
| 3,812,985 | 5/1974 | Lindeborg et al. | 414/526 |
| 4,002,252 | 1/1977 | Beckman, Jr. | 414/526 X |
| 4,078,685 | 3/1978 | Corbin et al. | 414/502 |
| 4,095,705 | 6/1978 | Hood | 414/526 X |
| 4,117,920 | 10/1978 | Oury | 198/311 |
| 4,244,674 | 1/1981 | Amunson | 414/503 X |
| 4,484,606 | 11/1984 | Koskis | 414/526 X |
| 4,669,945 | 6/1987 | Pollard et al. | 414/505 |
| 4,813,839 | 3/1989 | Compton | 198/311 X |

Primary Examiner—David A. Bucci
Attorney, Agent, or Firm—Stephen T. Belsheim

[57] ABSTRACT

A grain hopper assembly to receive grain unloaded from a bottom unloading grain transport vehicle. The assembly comprises a shell having opposite ends. An auger is mounted to the shell and conveys grain toward one end of the shell. A hopper tube has an auger contained therein. An attachment housing is at one end of the shell and connects the hopper tube to the shell so that the hopper tube auger operatively communicates with the auger whereby grain at the one end of the shell is received and conveyed by the hopper tube auger.

19 Claims, 4 Drawing Sheets

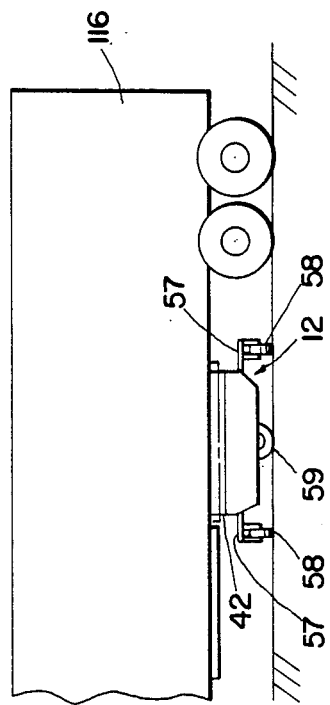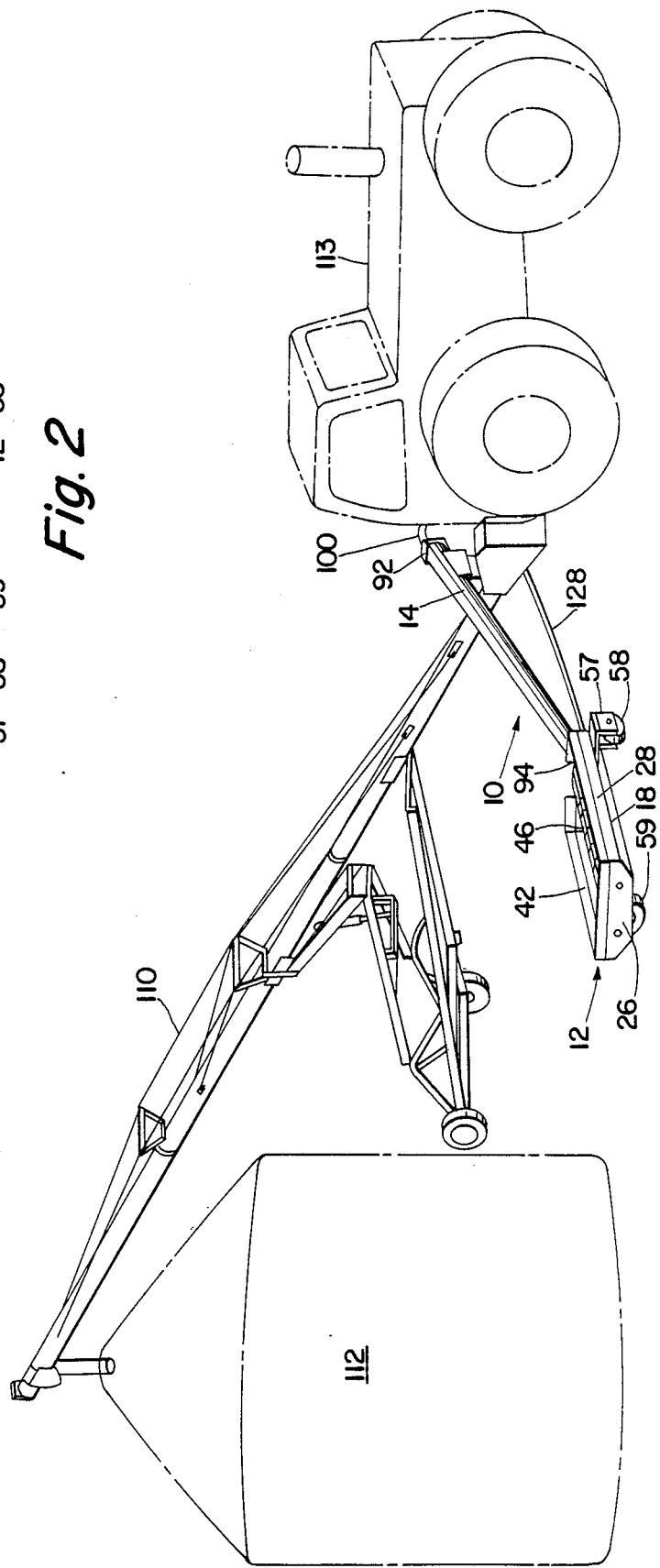

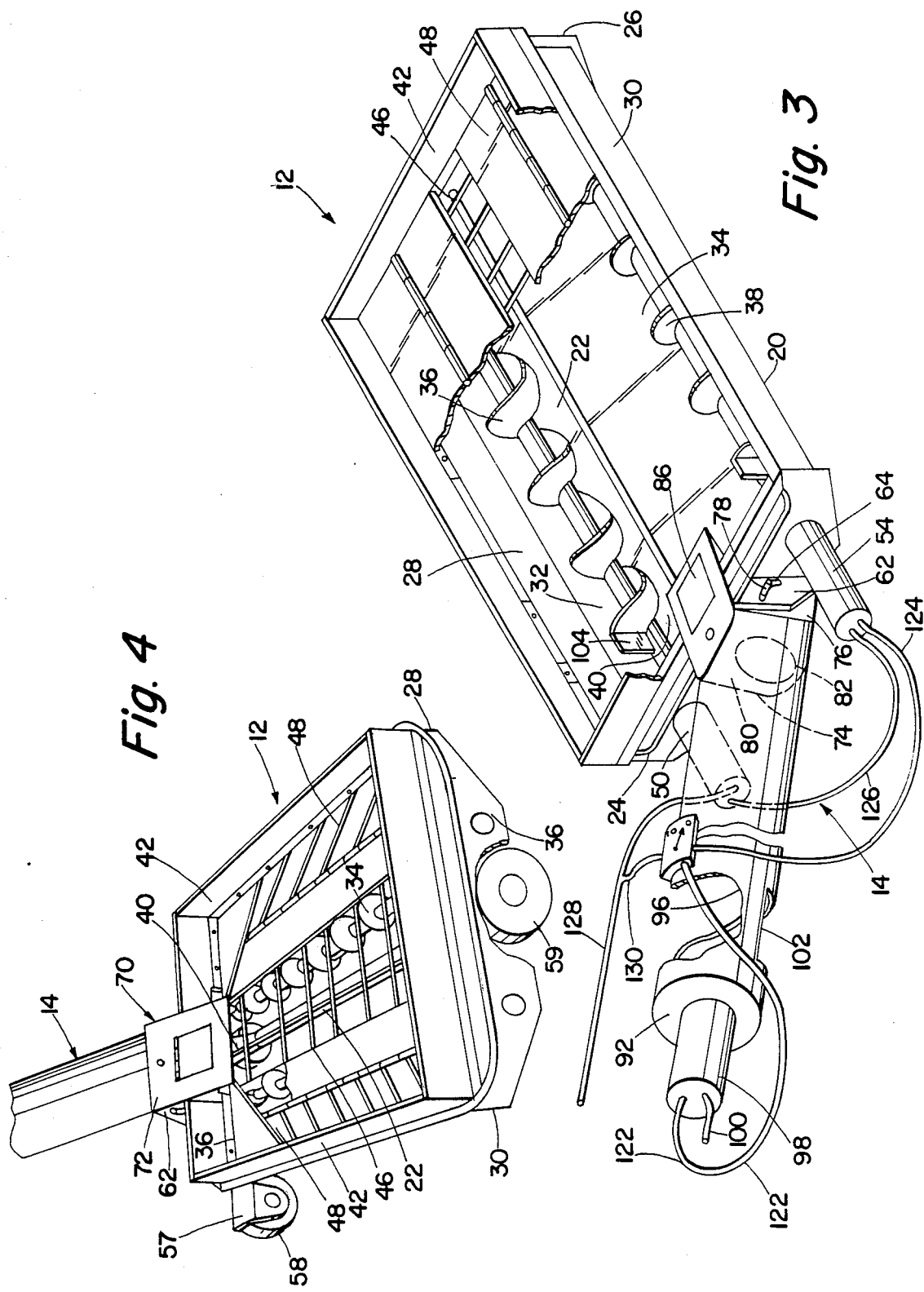

GRAIN HOPPER ASSEMBLY

BACKGROUND OF THE INVENTION

The invention pertains to a grain hopper assembly, and more specifically, to a grain hopper assembly adapted to receive grain unloaded from a bottom unloading style of grain transport vehicle.

In the past, grain has been transported by vehicles, such as dump trucks. The grain is unloaded from the dump truck by raising the truck bed whereby grain exits through a tail gate into a hopper positioned adjacent the tail gate so as to receive the exiting grain. In this regard, U.S. Pat. No. 2,619,219 illustrates a conveyor with an adjustable hopper designed to be utilized with a dump truck.

One drawback that has existed with earlier known devices is their inability to be utilized in conjunction with a grain trailer which unloads through the bottom thereof. Earlier devices have not had the ability to be positioned underneath the trailer outlet and be operable.

Persons have strived to improve grain transport devices to optimize their efficiency. In the past, grain hoppers containing a conveyance assembly, e.g., an auger, have not provided for conveyance characteristics which can be varied to correspond to a particular grain handling situation.

It thus becomes apparent that there exists a need for an improved grain hopper assembly. Such an improved grain hopper assembly should have the ability to be utilized to operate in conjunction with a bottom unloading grain transport vehicle such as a trailer. Such an improved grain hopper assembly should have the ability to provide a variety of conveyance characteristics to correspond to a particular grain handling situation For example, the selective operation of a particular grain auger out of a plurality of grain augers is a desirable characteristic.

SUMMARY OF THE INVENTION

It is a principal object of the invention to provide an improved grain hopper assembly.

It is another object of the invention to provide an improved grain hopper assembly to receive grain unloaded from a bottom unloading grain transport vehicle such as a trailer.

It is another object of the invention to provide an improved grain hopper assembly wherein the conveyance characteristics thereof can be varied to correspond to a particular grain handling situation.

It is another object of the invention to provide an improved grain hopper assembly wherein one may selectively operate a particular grain auger out of a plurality of grain augers to obtain a desired operating characteristic.

In one form thereof, the invention is a grain hopper assembly to receive grain unloaded from a bottom unloading grain transport vehicle. The assembly comprises a shell having opposite ends. An auger means, which is mounted to the shell, is used for conveying grain toward one end of the shell. A hopper tube has an auger contained therein. A means, which is at one end of said shell, is used for connecting the hopper tube to the shell so that the hopper tube auger operatively communicates with the auger means, whereby grain at one end of the shell is received and conveyed by the hopper tube auger.

In another form thereof, the invention is a grain hopper assembly that comprises a shell defining a grain collection volume at one end thereof. A first auger is operatively mounted to the shell so that when in operation, the first auger conveys grain towards the grain collection volume. A hopper tube has a second auger operatively connected therein. The grain hopper assembly further includes a means, which is pivotally mounted to the shell, for placing the hopper tube in communication with the shell so that a portion of the second auger is within the grain collection volume.

In another form thereof, the invention is a grain hopper assembly for handling grain unloaded from a bottom unloading grain trailer. The hopper assembly comprises a shell having a bottom defining a pair of wells separated by a V-shaped landing, and a grain collection volume. The shell further includes upstanding side walls at the periphery of the shell bottom. The side wall adjacent the grain collection volume contains an opening therein. A first auger is rotatably mounted to the shell and is positioned within one of the wells. The first auger is driven by a first motor. A second auger is rotatably mounted to the shell and is positioned within another one of the wells. The assembly further includes a hopper tube which contains a third auger driven by a third motor. A housing is pivotally mounted to the shell within the opening. The hopper tube is mounted to the housing whereby the housing places the hopper tube and the shell in communication.

BRIEF DESCRIPTION OF THE DRAWINGS

The above-mentioned and other features and objects of the invention, and the manner of attaining them, will become more apparent and the invention itself will be better understood by reference to the following description of a specific embodiment of the invention taken in conjunction with the accompanying drawings, wherein:

FIG. 1 is a perspective view of the specific embodiment of the invention being utilized in conjuction with a grain auger assembly for delivering grain to a storage bin;

FIG. 2 is a side schematic view of the specific embodiment of FIG. 1 positioned underneath the bottom outlet of a grain transport trailer;

FIG. 3 is a perspective view of the specific embodiment of FIG. 1 without the wheels illustrated and a portion of the hopper tube, flexible seal, protective screen and longitudinal covers removed;

FIG. 4 is a perspective view of the specific embodiment of FIG. 1 taken from an angle different than that of FIG. 3, with the wheels attached and a portion of the housing removed;

DETAILED DESCRIPTION OF A SPECIFIC EMBODIMENT

Figure 5:
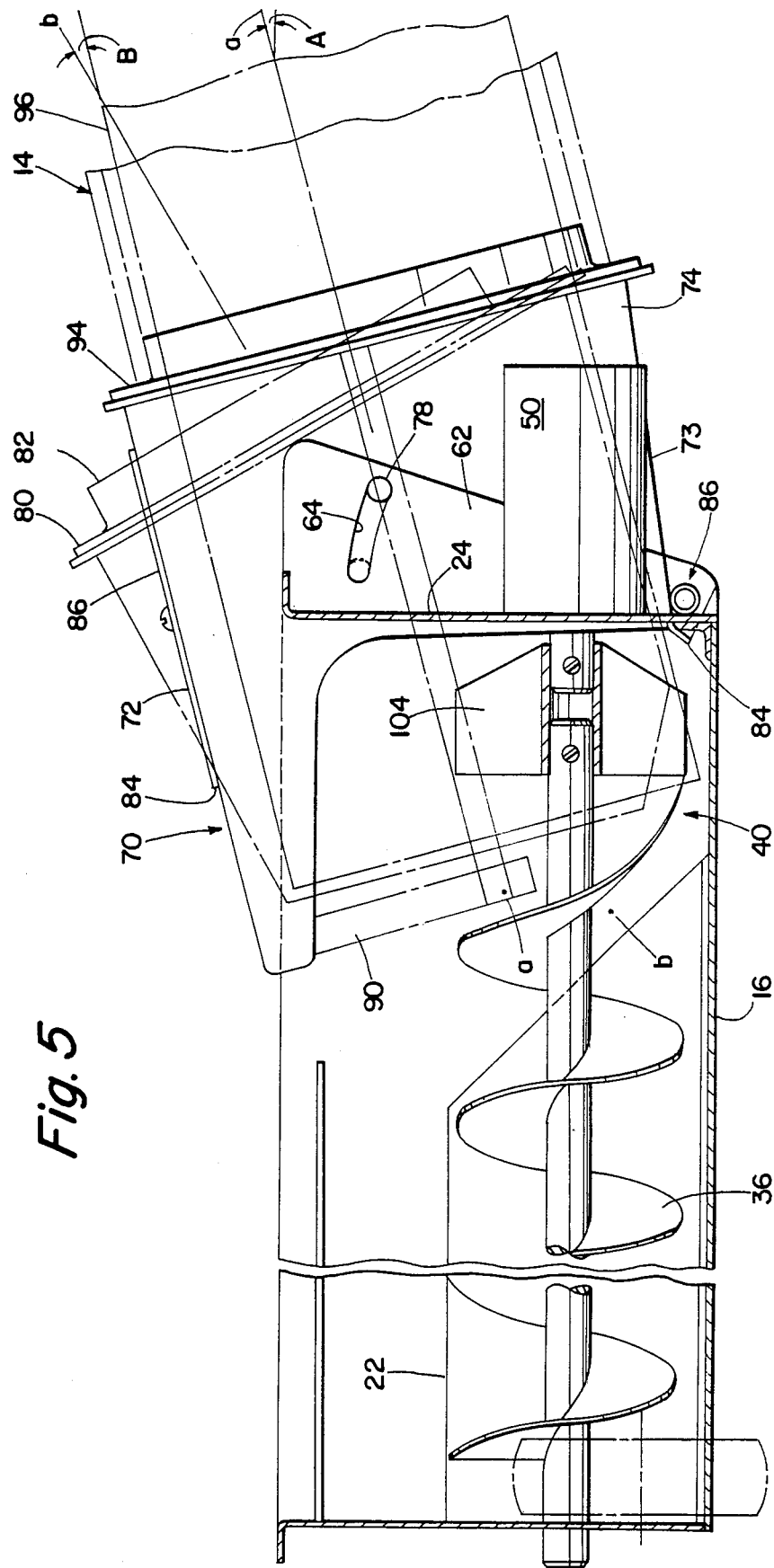
FIG. 5 is a side view of the specific embodiment of FIG. 1 adjacent the point of attachment between the hopper tube and the hopper illustrating the maximum and minimum degrees of relative positioning between the hopper and the attachment housing.

Referring to the drawings, there is illustrated a specific embodiment of the grain hopper assembly of the invention generally designated as 10. Grain hopper assembly generally designated 10 includes a hopper generally designated as 12 operatively connected to a hopper tube generally designated as 14.

Hopper 12 includes a bottom 16 having a pair of inclined sides 18 and 20 separated by a generally V-shaped landing 22. Hopper 12 further includes a front wall 24, a rear wall 26 and side walls 28 and 30. Bottom 16, front wall 24, rear wall 26 and side walls 28 and 30 together form an enclosure which can be considered to be a shell.

Inclined surface 18, side wall 28, a portion of V-shaped landing 22, a portion of front wall 24 and a portion of rear wall 26 together define a volume considered to be an auger well 32. An auger 36, which is rotatably mounted to hopper 12, is positioned within auger well 32.

Inclined surface 20, a portion of V-shaped landing 22, side wall 30, a portion of front wall 24 and a portion of rear wall 26 together define another volume considered to be auger well 34. A second auger 38, which is rotatably mounted to hopper 12, is positioned within auger well 34.

V-shaped landing 22 extends from rear wall 26 toward front wall 24. At a point that is rearward of front wall 24 V-shaped landing 22 begins to taper toward bottom 16 in such a fashion that there is to provided a grain accumulation volume generally designated as 40. Grain accumulation volume 40 is adjacent front wall 24.

A flexible seal 42, made out of a continuous strip of rubber or the like, extends upwardly from the top surface of rear wall 26, side walls 28 and 30, and a portion of the front wall 24 of the hopper. Seal 42 is absent from the portion of front wall 24 that corresponds with the opening in front wall 24. It should be mentioned that in the drawing identified as FIG. 3, a portion of the flexible seal 42 is removed to better illustrate the structure within the hopper.

Hopper 12 also includes a protective screen 46 and longitudinal covers 48 positioned over the entrance into hopper 12. As can be appreciated, the particular arrangement of the protective screen and covers can be varied to accommodate various grain handling applications. It is contemplated that the screen and/or covers will permanently be over the entrance into the hopper 12 to prevent entry of large objects therein when the hopper assembly is in operation.

Referring to FIGS. 1, 2 and 4, hopper 12 further includes a pair of castor wheel assemblies wherein each castor wheel assembly is comprised of a wheel support 57 to which a wheel 58 is rotatably mounted. One castor wheel assembly is swivelably mounted to the hopper at one corner thereof adjacent the hopper tube. The other castor wheel assembly is swivelably mounted to the hopper at the other corner thereof adjacent the hopper tube.

Referring to FIG. 4, hopper 12 also includes a wheel cavity underneath the V-shaped landing 22 adjacent to the rear wall 26. A second wheel 59, as illustrated in FIGS. 1, 2 and 4, is rotatably mounted to the hopper and is positioned within the wheel cavity.

The wheel assembly described above facilitates the stability of the hopper during operation. More specifically, the wheels 58 of the castor wheel assembly can be positioned relative to the orientation of the wheel 59 to permit the wheel assembly to elimate any substantial movement of the hopper during an unloading operation.

Grain hopper assembly 10 further includes a first hydraulic motor 50 which is operatively connected to first auger 36 so that first auger 36 rotates under the driving power of first hydraulic motor 50. A more detailed description pertaining to the connection of the corresponding hydraulic lines is set forth hereinafter.

Grain hopper assembly 10 further includes a second hydraulic motor 54 which is operatively connected to second auger 38 so that second auger 38 rotates under the driving power of second hydraulic motor 54. A more detailed description pertaining to the connection of the corresponding hydraulic lines is set forth hereinafter.

As mentioned earlier, front wall 24 contains an opening. The opening in front wall 24 is defined by a pair of forwardly projecting flanges 62, wherein each one of said flanges containing an arcuate slot 64 therein.

An attachment housing, generally designated as 70, is pivotally connected to hopper 12 at the opening in the front wall 24. Attachment housing 70 includes a top wall 72, a bottom wall 73, and side walls 74 and 76. A pin 78 projects outwardly from each side 74 and 76 and registers with each corresponding arcuate slot 64. Attachment housing 70 further includes a front wall 80 containing an opening 82 therein. Front wall 80 of attachment housing 70 further includes a bottom edge 84 at which attachment housing 70 is pivotally connected to hopper 12 by a pivotal connection generally designated as 86.

Top wall 72 contains an opening 84 therein. A cover 86 is hingedly mounted to top wall 72 so as to selectively cover opening 84. Cover 86 is maintained in a closed condition, thereby covering opening 84, during operation.

Attachment housing 70 further includes a hanger bearing 90 mounted to the interior surfacer of the top wall 72 and depending downwardly therefrom so as to be contained within the volume defined by attachment housing 70.

Hopper tube 14 has an upper end 92 and a lower end 94. A hopper auger 96, having opposite upper and lower ends, is rotatably contained within hopper tube 14. Hopper auger 96 is journalled at its lower end in hanger bearing 90.

A hydraulic motor 98 is mounted at the upper end 92 of hopper 14 and is operatively connected to the upper end of hopper auger 96. A more detailed description pertaining to the hydraulic connection of the hydraulic motor 98 is set forth hereinafter. Hopper tube 14 further includes an opening 102 contained in the underside thereof that corresponds with the opening (not illustrated) contained in an auger assembly 110.

Figure 6:
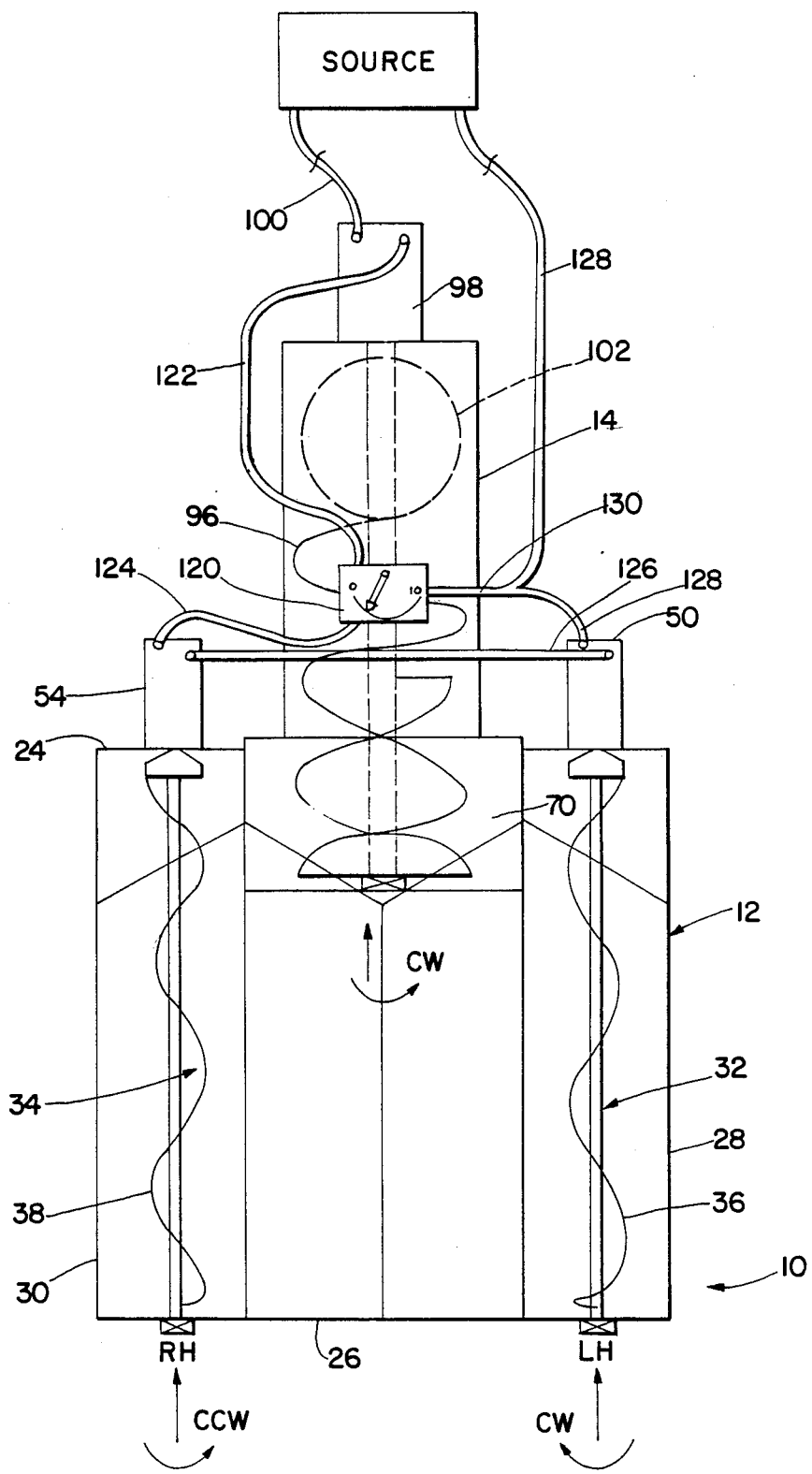
FIG. 6 is a schematic view of the hydraulic system that controls the operation of the motors which power the augers.

FIG. 6 illustrates the hydraulic connections between the hydraulic motors (50, 54 and 98), as well as the flow controller 120. These hydraulic connections and the overall operation of the hydraulic motors will now be described.

Hydraulic motor 98 is operatively connected to the hopper auger 96 to thereby cause it to rotate. The operation of hydraulic motor 98 is continuous and is controlled by the amount of fluid flowing thereto from the source of hydraulic fluid. As illustrated in FIGS. 3 and 6, hydraulic fluid flows into hydraulic motor 98 through hydraulic line 100.

The outlet of hydraulic motor 98 is in fluid communication with the flow controller 120 through hydraulic line 122. Flow controller 120 is a conventional flow controller that controls the flow of hydraulic fluid to hydraulic motors 50 and 54. In this regard, flow controller 120 may be set at any setting between "0" and "10". When set at "0", all of the hydraulic fluid flows back to the source directly from the flow controller. When set at "10", none of the fluid flows directly back to the source from the flow controller but, instead, all of the hydraulic fluid flows to hydraulic motor 54.

When flow controller 120 is at "0" on the dial (illustrated in FIG. 6), no hydraulic fluid flows to motors 50 and 54. All of the fluid is cycled back to the source of hydraulic fluid. Consequently, the hopper auger 96 is the only auger in operation, and it operates under what can be considered to be full power.

When flow controller 120 is set at "10" on the dial (illustrated in FIG. 6), all of the hydraulic fluid passing into the flow controller 120 flows through hydraulic line 124 to hydraulic motor 54. As can be appreciated, the flow into hydraulic motor 54 causes it to operate thereby driving auger 38. Hydraulic fluid exits hydraulic motor 54 through hydraulic line 126 and flows to hydraulic motor 50. The flow of hydraulic fluid into hydraulic motor 50 causes it to operate thereby driving auger 36. Hydraulic fluid exits motor 50 and returns to the source of hydraulic fluid through line 128.

As can be appreciated, when the flow controller 120 is set between "0" and "10" a certain volume of hydraulic fluid is cycled directly back to the source through lines 130 and 128 and a certain volume of hydraulic fluid passes on to operate motors 54 and 50 and is then recycled back to the source through line 128.

The ability to vary the flow of fluid to the hydraulic motors is advantageous to the operation of the apparatus. This is especially the case when grain plugs tube 14. When this occurs, the operator switches the dial to "0" so that all fluid is directed to the operation of the hydraulic motor 98 operating the hopper auger 96. Full power is provided to hopper auger 96 so as to unplug the hopper tube 14 so that grain can be moved from the housing area.

Referring specifically to FIG. 1, there is illustrated a storage bin 112 into which grain is delivered by auger assembly 110. Auger assembly 110 receives grain from the hopper assembly 10. A tractor 113 provides the hydraulic power for operating the grain hopper assembly 10.

A detailed description of the operation of the grain hopper assembly 10 is set forth hereinafter.

In operation, a grain delivery vehicle, which pulls a grain trailer 116, positions the grain trailer 116 in a preselected position which is adjacent the grain auger assembly 110. In this regard, one is referred to FIG. 2 which schematically illustrates the relative positioning of the grain trailer 116 and grain hopper assembly 10. Once the grain trailer 116 is correctly positioned, the grain hopper assembly 10 is positioned underneath the trailer 116 so as to be in alignment with the bottom opening through which grain is unloaded. In this regard, one is again referred to FIG. 2 which schematically illustrates the relative positioning of the grain trailer 116 and grain hopper assembly 10.

As can be appreciated, the height that the trailer is off the ground varies depending upon the specific structure of the trailer. Consequently, the angle between the hopper 12 and the hopper tube 14 may vary depending upon the specific trailer. However, because of the pivotal connection (86) between the hopper 12 and hopper tube 14, provided by the attachment housing 70, the grain hopper assembly 10 of the present invention easily accommodates trailers of various dimensions by providing the ability to vary the relative angle between the hopper 12 and hopper tube 14.

Insofar as the specific angle is concerned, the preferred specific embodiment is pivotable between an included angle A (FIG. 5) of about 15 degrees and an angle B (FIG. 5) of about 30 degrees. This angle is measured between the longitudinal axis of the hopper tube 14 and the central longitudinal axis (a—a or b—b) of the hopper 12. However, it should be appreciated that other specific included angles of pivot outside the scope of the above-recited range are contemplated by the invention.

The attachment housing 70 is pivotally connected at the bottom edge 84 of the front surface 80 thereof to the front wall 24 of hopper 12 adjacent the opening. In order to vary the relative orientation between the hopper tube 14 and the hopper 12, the attachment housing 70 is pivoted about the pivotal connection 86.

Once the grain hopper assembly 10 is correctly positioned, the wheels are correctly oriented. Then the slide gate of the grain trailer 116 is moved to an open position and grain exits the trailer into the hopper 12. The exiting grain enters into the hopper 12 through the screen 46. Grain falling directly into each auger well 32, 34 remains in its respective auger well until impacted by its respective auger 36, 38. Exiting grain which falls on the V-shaped landing 22 will slide into either auger well 32, 34. Thus, all of the grain exiting the grain trailer 116 passes into either the first auger well 32 or the second auger well 34.

Prior to the unloading of the grain trailer 116, the grain hopper assembly 10 is made operative causing the first, second and third augers (36, 38 and 96) to rotate. It should be noted that each auger is driven by a separate hydraulic motor (50, 54 and 98) which is operatively connected to the hydraulic unit of the tractor 116. It is contemplated that the hydraulic motor can be of various sizes and operating characteristics. Thus, the hopper assembly can accommodate a variety of grain handling situations.

The grain in each auger well (32, 34) is carried by its respective auger (36, 38) toward to forward end of the hopper 14. The conveyed grain is deposited into a grain collection volume 40 at the forward end of the hopper 12. In this regard, auger 36 is a left hand auger and rotates in a clockwise direction as viewed from the rear of the hopper assembly. Auger 38 is a right hand auger and rotates in a counter-clockwise direction as viewed from the rear of the hopper assembly.

Each auger 36, 38 contained within the hopper 12 includes a screw portion extending for most of its length, except that at the end adjacent the hopper tube 12, each auger 36, 38 has an radially outwardly projecting section which may be characterized as a flipper 104. This flipper 104 impacts the grain and propels it toward the grain collection volume 40.

As previously described, the one end of the hopper auger 96 is contained within the grain collection volume 40. As the grain is conveyed from the auger wells (32, 34) into the grain collection volume 40, the hopper auger 96 impacts the grain thereby carrying it from the hopper 12 and through the hopper tube 14 so that the grain exits the hopper tube 14 through its underneath side opening 102 and into the grain auger assembly 110. In this regard, hopper auger 96 is a right hand auger and rotates in a counterclockwise direction when viewed from the intake of the hopper tube.

The grain auger assembly 110 transports the grain to the storage bin 112 where the grain is stored.

It can thus be appreciated that the attachment housing 70 provides communication between the hopper tube 14 and the hopper 12. The attachment housing 70 also provides for the pivotal connection between the hopper tube 14 and the hopper 12 so that the relative angle therebetween can be varied to suit a particular grain handling application.

It is contemplated that the size of the augers can be varied to be appropriate for a particular grain handling application. However, it is typically the case that the first and second augers will be of the same size, and the hopper (or third) auger will be larger in size than the first and second augers.

When the grain trailer 116 has been unloaded of grain to the desired extent, the slide gate is closed thereby prevented the exit of any grain from the grain trailer 116. The grain hopper assembly 10 is rolled out from underneath the trailer, and the truck can drive the grain trailer away from the grain hopper assembly 10.

While this invention has been described as having a preferred specific embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. A grain hopper assembly to receive grain unloaded from a bottom unloading grain transport vehicle, the assembly comprising:
   a shell having opposite ends, said shell defining a top opening through which grain is received from a bottom outlet of the grain transport vehicle;
   said shell further including a bottom wall and side walls extending up from said bottom wall, and a flexible sealing means, attached to said side walls, for forming a partial seal with the vehicle unloading the grain;
   an auger means, mounted to said shell, for conveying grain toward one end of said shell;
   a hopper tube having an auger contained therein;
   a means, at one end of said shell, for connecting said hopper tube to said shell so that said hopper tube auger operatively communicates with said auger means whereby grain at the one end of the shell is received and conveyed by the hopper tube auger.

2. The grain hopper assembly of claim 1 wherein said shell further includes a bottom defining a pair of wells, a V-shaped landing separating said wells whereby all grain entering the hopper passes into either well.

3. The grain hopper assembly of claim 2 wherein said auger means included a pair of shell augers, each said well containing one of said shell augers, and each of said shell augers being directly driven by a motor whereby each said shell auger conveys grain toward said one end of said shell.

4. The grain hopper assembly of claim 1 wherein a screen permanently covering said top opening.

5. The grain hopper assembly of claim 1 wherein said hopper tube has opposite ends, one of said ends mounted to said connecting means and other of said ends in communication with the destination for said grain.

6. The grain hopper assembly of claim 1 wherein said hopper tube auger is directly driven by a motor.

7. The grain hopper assembly of claim 1 wherein said shell includes a bottom and side walls integral with said bottom, the side wall at said one end of said hopper containing an opening, a flange integral with said side wall and containing a slot extending from said opening, said connecting means including a housing pivotally mounted to said one side wall at said opening, a pin extending from said housing and registering within said slot.

8. The grain hopper assembly of claim 7 wherein said slot is configured so as to define a degree of pivot of said housing relative to said shell.

9. The grain hopper assembly of claim 8 wherein said housing is positioned relative to said hopper at an angle between about 15 degrees and about 30 degrees.

10. The grain hopper assembly of claim 1 further including a wheel means, mounted to said shell, for permitting selective rolling movement of the grain hopper assembly.

11. The grain hopper assembly of claim 10 wherein said wheel means includes a pair of castor wheel assemblies mounted to said shell at one opposite end thereof adjacent the hopper tube, and a wheel mounted to the shell adjacent another opposite end thereof.

12. A grain hopper assembly to receive grain unloaded from a bottom unloading grain transport vehicle, the assembly comprising:
   a shell defining a grain collection volume at one end thereof, said shell further having a bottom wall with side walls extending from said bottom wall, a sealing means, attached to said side walls, for forming a partial seal with the vehicle unloading the grain;
   a first auger operatively mounted to said shell so that when in operation said first auger conveys grain towards the grain collection volume;
   a hopper tube having a second auger operatively mounted therein; and
   means, pivotally mounted to the shell, for placing said hopper tube in communication with said shell so that a portion of said second auger is within said grain collection volume.

13. The grain collection assembly of claim 12 wherein said first auger is driven by a first hydraulic motor and said second auger is driven by a second hydraulic motor.

14. The grain collection assembly of claim 13 further including a third auger operatively mounted to said shell so that when in operation said third auger conveys grain towards the grain collection volume, and said third auger is driven by a third hydraulic motor.

15. The grain assembly of claim 14 wherein said second hydraulic motor is in direct receiving communication with a source of hydraulic fluid, said first and third motors are in direct communication and said third motor is in direct exiting communication with the source of hydraulic fluid.

16. The grain hopper assembly of claim 15 further including a flow control means for controlling flow of said hydraulic fluid to said first and third motors, said flow control means being selectable between one condition in which no hydraulic fluid exiting said second motor flows to said first and third motors and another condition in which all of the hydraulic fluid exiting said second motor flows to said first and third motors.

17. The grain hopper assembly of claim 12 wherein said placing means is movable so that the hopper tube is positioned relative to the shell at a range between about 15 degrees and about 30 degrees.

18. A grain hopper assembly for handing grain unloaded from a bottom-unloading grain trailer, the hopper assembly comprising:

a shell having a bottom defining a pair of wells seprated by a V-shaped landing and a grain collection volume, said shell further including upstanding side walls at a periphery of the shell bottom, said side wall adjacent the grain collection volume having an opening therein, a flexible sealing means, attached to said side walls, for forming a partial seal with the grain trailer;

a first auger rotatably mounted to the shell and positioned within one of the wells, and the first auger being driven by a first motor;

a second auger rotatably mounted to the shell and positioned within another of the wells, and the second auger being driven by a second motor;

a hopper tube containing a third auger, and a third motor driving said third auger; and a housing pivotally mounted to said shell within said opening, said hopper tube mounted to said housing whereby said housing places said hopper tube and said shell in communication.

19. The grain hopper assembly of claim 18 further including means for defining a range of pivot of said hopper tube relative to said shell to be between about 15 degrees and about 30 degrees.

* * * * *